United States Patent
Xu

(10) Patent No.: US 9,237,429 B2
(45) Date of Patent: Jan. 12, 2016

(54) METHOD AND SYSTEM FOR IMPLEMENTING PACKET SWITCH DOMAIN SHORT MESSAGE SERVICE, AND USER EQUIPMENT

(75) Inventor: Hui Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/130,357

(22) PCT Filed: May 24, 2012

(86) PCT No.: PCT/CN2012/076000
§ 371 (c)(1),
(2), (4) Date: Dec. 31, 2013

(87) PCT Pub. No.: WO2013/143223
PCT Pub. Date: Oct. 3, 2013

(65) Prior Publication Data
US 2015/0011250 A1   Jan. 8, 2015

(30) Foreign Application Priority Data
Mar. 30, 2012 (CN) .......................... 2012 1 0090257

(51) Int. Cl.
*H04W 4/14* (2009.01)
*H04L 12/58* (2006.01)
*H04W 8/10* (2009.01)

(52) U.S. Cl.
CPC ............. *H04W 4/14* (2013.01); *H04L 12/5895* (2013.01); *H04L 51/38* (2013.01); *H04W 8/10* (2013.01)

(58) Field of Classification Search
CPC .......... H04W 4/14; H04W 8/10; H01L 51/38; H01L 12/5895
USPC ............................... 455/432.3, 433, 435, 466
See application file for complete search history.

(56) References Cited

U.S. PATENT DOCUMENTS

2011/0098063 A1   4/2011   Richardson
2013/0143610 A1*  6/2013   Jeong et al. ................... 455/466

FOREIGN PATENT DOCUMENTS

CN   102118733 A   7/2011

OTHER PUBLICATIONS

International Search Report for PCT/CN2012/076000 dated Dec. 25, 2012.

(Continued)

*Primary Examiner* — Sam Bhattacharya
(74) *Attorney, Agent, or Firm* — Ling Wu; Stephen Yang; Ling and Yang Intellectual Property

(57) ABSTRACT

A method for implementing a Packet Switched domain (PS) short message service (SMS) includes: after receiving request message containing an SMS-only indication transmitted by a user equipment, a mobility management entity enquiring subscription information of the user equipment from a home subscriber server, and receiving the subscription information of the user equipment returned by the home subscriber server; and when the mobility management entity supports the PS SMS and the subscription information supports the PS SMS, the mobility management entity transmitting request acceptance message to the user equipment, receiving and transmitting an SMS between the mobility management entity and the user equipment through a Packet Switched domain. Embodiments of the present document further provide a system for implementing a PS SMS and a user equipment. By means of the scheme of the present document, the PS SMS can be implemented in an EPS system.

12 Claims, 6 Drawing Sheets

(56) References Cited

OTHER PUBLICATIONS

3GPP Technical Specification Group Service and System Aspect. 3GPP TS 23.272 V10.6.0: Circuit Switched (CS) fallback in Evolved Packet System (EPS) Stage 2 (Release 10). 3rd Generation Partnership Project (3GPP). Dec. 2011, pp. 46-50, section 8.2.

Technical Specification Group Services and System Aspects; System Improvements for Machine-Type Communications; 3GPP TR 23.888 V1.6.0(Nov. 2011).

Technical Specification Group Services and System Aspects; Cricuit Switched (CS) fallback in Evolved Packet System (EPS); 3GPP TS 23.272 V10.5.0(Sep. 2011).

Default MSC Concept for SMS delivery with PS only subscription; CATT; SA WG2 Meeting #88; Nov. 14-18, 2011, San Francisco, USA; S2-115082.

\* cited by examiner

METHOD AND SYSTEM FOR IMPLEMENTING PACKET SWITCH DOMAIN SHORT MESSAGE SERVICE, AND USER EQUIPMENT

TECHNICAL FIELD

The present document relates to a technology of implementing a Short Message Service (SMS) of the 3rd Generation Partnership Project (3GPP), and in particular, to a method, system for implementing a Packet Switched domain (PS) SMS in an Evolved Packet System (EPS), and a user equipment.

BACKGROUND OF THE RELATED ART

Mobile communication network services can be divided into two categories in view of a technical implementation: one is Circuit Switched (CS) services, such as voice services and SMS services; the other is Packet Switched (PS) services, such as web browsing services.

In order to effectively use mobile network resources, the 3GPP proposes Long Term Evolution (LTE), which is a system architecture completely based on packets, and supports real-time services and voice session services through the packet architecture. The LTE based system is referred to as an EPS, and the EPS architecture of the 3GPP is shown in FIG. 1.

Roaming is a major function of the mobile communication network, different operators can allow subscribers to share their networks by a roaming agreement, and roaming commonly occurs between networks of operators which are deployed in different geographical regions. In order to identify an original network to which the subscriber belongs and a new network to which the subscriber roams, both of the networks are generally distinguished by a home location and a visited location. When the network properties of the home location and the visited location are the same, for example, both are the LTE or Universal Mobile Telecommunications System (UMTS) networks, the roaming is referred to as an in-band roaming. Even being the in-band roaming, services provided by the home network and the visited network may also be different.

The SMS is for the purpose of transmitting information through a Service Centre (SC) between a Short Message Entity (SME) and a user equipment. The SMS includes Mobile Originated (MO) services and Mobile Terminating (MT) services, i.e., including the user equipment transmitting or receiving information. The network architecture of the transmission of the CS SMS is shown in FIG. 2, an SME and an SMS-SC are included outside the 3GPP or GSM network, and an SMS Gateway Mobile Switching Center (GMSC) or an SMS Interconnect Mobile Switching Center (IWMSC), an SMS router, a MSC or Visitor Location Register (VLR) or a Service GPRS Support Node (SGSN) and a Mobile Station (MS) are included in the 3GPP or GSM network.

With respect to the demand for LTE packet access, the 3GPP proposes requirements of PS-only SMS, i.e., the SMS being implemented through the PS domain, the PS-only here includes two cases: one is that the SMS can only be implemented through the PS domain; and the other is that if the SMS cannot be implemented through the PS, it can also be implemented through the CS, i.e., PS-preferred.

At present, the SMS in the 3GPP can be implemented through a CS domain or a PS domain, wherein the traditional 2/3G networks generally use the CS domain SMS, for the EPS system, the core network uses packet architecture, there are the following several schemes for implementing the EPS SMS: SMS over IP Multimedia Subsystem (IMS), CS FallBack (CSFB), SMS over SGs etc., and the EPS structural diagram of CSFB and SMS over SGs are illustrated in FIG. 3. All the above schemes are based on the auxiliary systems or add the interfaces from the PS to the circuit domain to implement the SMS, and in the related art, there has no specific solutions for the PS SMS in the EPS. For the scene of LTE in-band roaming, how to implement the SMS also has not been solved.

SUMMARY OF THE INVENTION

The main purpose of the embodiments of the present document is to provide a method, system for implementing a PS SMS and a user equipment, which can solve the problem of implementing the PS SMS in an EPS.

In order to solve the above problem, the present document provides a method for implementing a PS SMS, comprising:

after receiving request message containing an SMS-only indication transmitted by a user equipment, a mobility management entity enquiring subscription information of the user equipment from a home subscriber server, and receiving the subscription information of the user equipment returned by the home subscriber server; and when the mobility management entity supports the PS SMS and the subscription information supports the PS SMS, the mobility management entity transmitting request acceptance message to the user equipment, the mobility management entity receiving and transmitting an SMS from and to the user equipment through a Packet Switched domain.

The above method can further comprise the following features. The method further comprises: when the mobility management entity supports the PS SMS, the mobility management entity further transmitting an indication that the PS SMS is supported to the home subscriber server;

after receiving the indication that the PS SMS is supported, the home subscriber server registering the mobility management entity as an SMS service node of the user equipment.

The above method can further comprise the following features. The mobility management entity receiving and transmitting an SMS from and to the user equipment through a PS comprises:

the mobility management entity receiving and transmitting the SMS through PS non access stratum signaling from and to the user equipment.

The above method can further comprise the following features. Wherein, the request acceptance message comprises the following information: a Location Area Identity (LAI), which is a non-broadcast LAI, and is not associated with a Visitor Location Register (VLR); a Temporary Mobile Subscriber Identity (TMSI), which is a reserved TMSI; and an International Mobile Subscriber Identity (IMSI) attach is for the purpose of SMS-only.

The above method can further comprise the following features. The method further comprises:

when the mobility management entity supports the PS SMS and the subscription information of the user equipment does not support the PS SMS, or the mobility management entity does not support the PS SMS and the subscription information of the user equipment is PS-preferred, the mobility management entity receiving and transmitting the SMS through a circuit Switched domain or an SGs interface from and to the user equipment; and/or when the mobility management entity does not support the PS SMS and the subscription information of the user equipment is PS-only, the mobility management entity rejecting the request containing the SMS-only indication from the user equipment.

The above method can further comprise the following features. The mobility management entity is a home mobility management entity of the user equipment, or is a visited mobility management entity of the user equipment.

The above method can further comprise the following features. The request message containing an SMS-only indication is combined Attach/location update request message.

The present document further provides a system for implementing a PS SMS, comprising a mobility management entity and a home subscriber server, wherein, the mobility management entity is configured to, after receiving request message containing an SMS-only indication transmitted by a user equipment, enquire subscription information of the user equipment from the home subscriber server, receive the subscription information of the user equipment returned by the home subscriber server, when the mobility management entity supports a PS SMS and the subscription information supports the PS SMS, transmit request acceptance message to the user equipment, and receive and transmit an SMS from and to the user equipment; and the home subscriber server is configured to store the subscription information of the user equipment; and return the subscription information of the user equipment to the mobility management entity after receiving the request for enquiring the subscription information of the user equipment from the mobility management entity.

The above system can further comprise the following features. The mobility management entity is further configured to, when the mobility management entity supports the PS SMS, transmit an indication that the PS SMS is supported to the home subscriber server;

the home subscription server is further configured to after receiving the indication that the PS SMS is supported, register the mobility management entity as an SMS service node of the user equipment.

The above system can further comprise the following features. The mobility management entity is configured to receive and transmit the SMS through PS non access stratum signaling from and to the user equipment.

The above system can further comprise the following features. The request acceptance message comprises the following information: a Location Area Identity (LAI), which is a non-broadcast LAI, and is not associated with a Visitor Location Register (VLR); a Temporary Mobile Subscriber Identity (TMSI), which is a reserved TMSI; and an International Mobile Subscriber Identity (IMSI) attach is for the purpose of SMS-only.

The above system can further comprise the following features. The mobility management entity is further configured to:

when the mobility management entity supports the PS SMS and the subscription information of the user equipment does not support the PS SMS, or the mobility management entity does not support the PS SMS and the subscription information of the user equipment is PS-preferred, receive and transmit the SMS through a circuit Switched domain or an SGs interface from and to the user equipment; and/or when the mobility management entity does not support the PS SMS and the subscription information of the user equipment is PS-only, reject the request containing the SMS-only indication from the user equipment.

The above system can further comprise the following features. The mobility management entity is a home mobility management entity of the user equipment, or is a visited mobility management entity of the user equipment.

The above system can further comprise the following features. The request message containing an SMS-only indication is combined Attach/location update request message.

The present document further provides a user equipment, comprising:

a registering unit, configured to register subscription information about whether the user equipment supports the PS SMS at a home subscriber server;

a requesting unit, configured to transmit request message containing an SMS-only indication to the mobility management entity; and a short message receiving and transmitting unit, configured to receive and transmit an SMS through a PS from and to the mobility management entity after receiving the request acceptance message transmitted by the mobility management entity.

The above user equipment can further comprise the following features. The user equipment is configured to receive and transmit the SMS through PS non access stratum signaling from and to the mobility management entity.

The embodiments of the present document provide a method for implementing a PS SMS in an EPS, comprising: a user equipment (UE) transmitting an SMS-only indication to a mobility management entity (MME), the MME transmitting a response to the UE according to subscription data and capability of its own, and if the MME and the UE supports the PS SMS, receiving and transmitting through a PS domain; otherwise, receiving and transmitting through a CS or SGs interface. The embodiments of the present document further provide a system for implementing a PS domain SMS in an EPS and a user equipment. By the scheme of the embodiments of the present document, the problem of implementing the PS domain SMS in the EPS system can be solved.

PREFERRED EMBODIMENTS OF THE INVENTION

Figure 1:
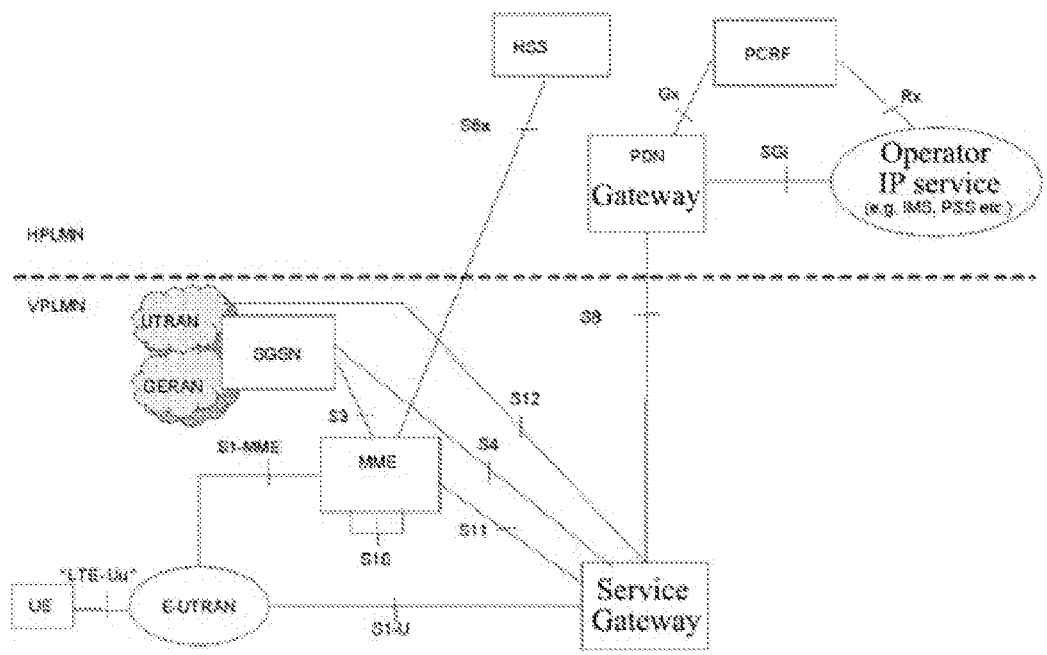
FIG. 1 is a structural diagram of an existing 3GPP EPS.
Figure 2:
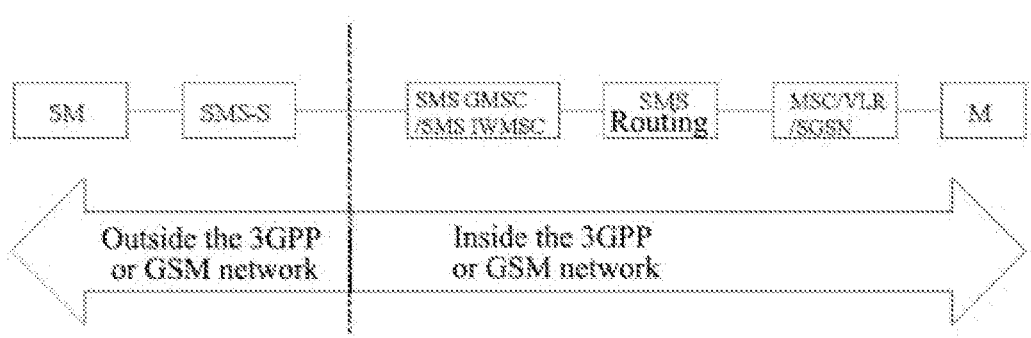
FIG. 2 is a diagram of a network architecture for CS domain SMS transmission in the related art.
Figure 3:
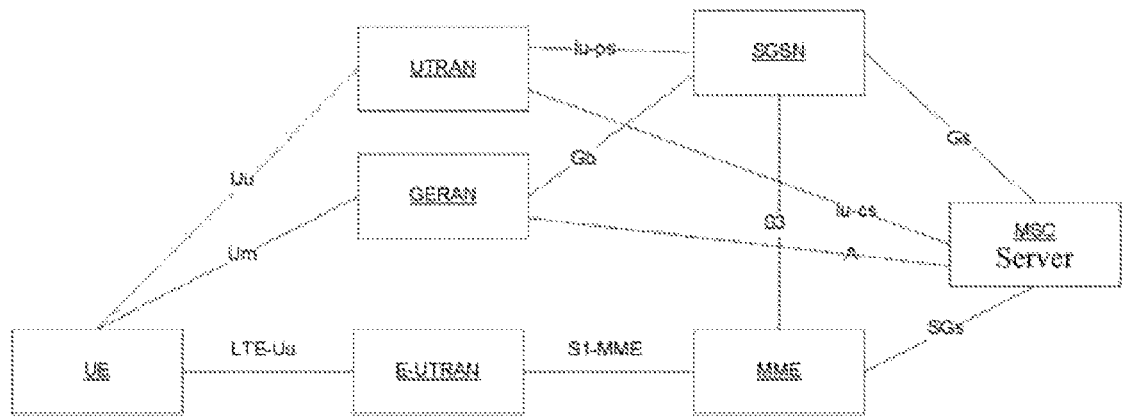
FIG. 3 is a diagram of an EPS architecture of CSFB and SMS over SGs in the related art.

The embodiments of the present document will be described in detail below in conjunction with accompanying drawings. It should be illustrated that, embodiments in the present application and features in the embodiments can be randomly combined with each other without conflict.

The embodiments of the present document provide a method for implementing a PS SMS, comprising:

after receiving request message containing an SMS-only indication transmitted by a user equipment, a mobility management entity enquiring subscription information of the user equipment from a home subscriber server, and receiving the subscription information of the user equipment returned by the home subscriber server; and when the mobility management entity supports the PS SMS and the subscription information supports the PS SMS, the mobility management entity transmitting request acceptance message to the user equipment, the mobility management entity receiving and transmitting an SMS from and to the user equipment through a PS.

Wherein, the method further comprises: when the mobility management entity supports the PS SMS, the mobility management entity further transmitting an indication that the PS SMS is supported to the home subscriber server;

after receiving the indication that the PS SMS is supported, the home subscriber server registering the mobility management entity as an SMS service node of the user equipment.

Wherein, the mobility management entity receiving and transmitting an SMS from and to the user equipment through a PS comprises:

the mobility management entity receiving and transmitting the SMS through PS non access stratum signaling from and to the user equipment.

Wherein, the request acceptance message comprises the following information: a Location Area Identity (LAI), which is a non-broadcast LAI, and is not associated with a Visitor Location Register (VLR); a Temporary Mobile Subscriber Identity (TMSI), which is a reserved TMSI; and an International Mobile Subscriber Identity (IMSI) attach is for the purpose of SMS-only.

Wherein, the method further comprises:

when the mobility management entity supports the PS SMS and the subscription information of the user equipment does not support the PS SMS, or the mobility management entity does not support the PS SMS and the subscription information of the user equipment is PS-preferred, the mobility management entity receiving and transmitting the SMS through a circuit Switched domain or an SGs interface from and to the user equipment; and/or when the mobility management entity does not support the PS SMS and the subscription information of the user equipment is PS-only, the mobility management entity rejecting the request containing the SMS-only indication from the user equipment.

Wherein, the mobility management entity is a home mobility management entity of the user equipment, or is a visited mobility management entity of the user equipment.

Wherein, the request message containing an SMS-only indication is combined Attach/location update request message.

The implementation process and principle of the method of the present document will be described below in detail in combination with specific embodiments.

Figure 4:
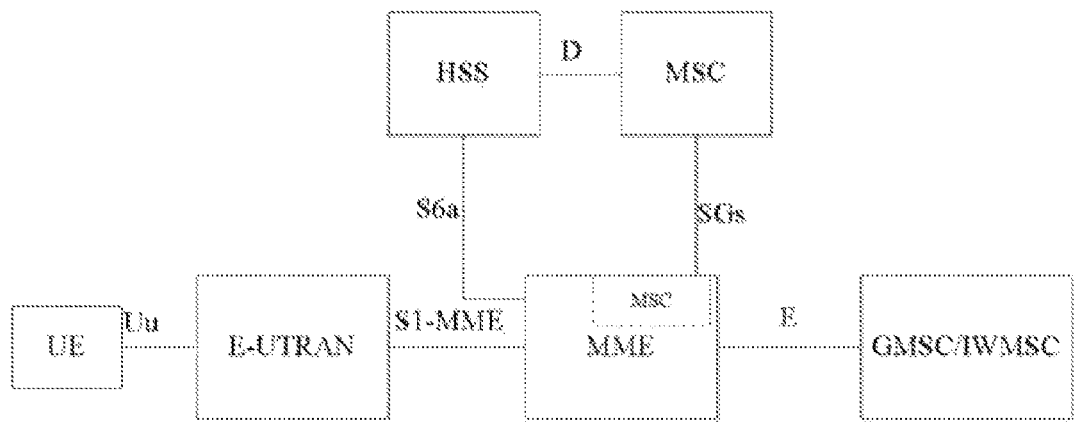
FIG. 4 is a diagram of a system framework according to an embodiment of the present document.

The system architecture of the present document is shown in FIG. 4, wherein the MME supports the SMS function, the MME is connected to the GMSC/IWMSC through an E interface to receive and transmit the SMS, and the MME is connected to the HSS through an S6a interface; in the in-band roaming scene, the MME can receive and transmit the SMS through an SGs interface, and can obtain the SMS subscription information through a D interface.

Embodiment One

Figure 5:
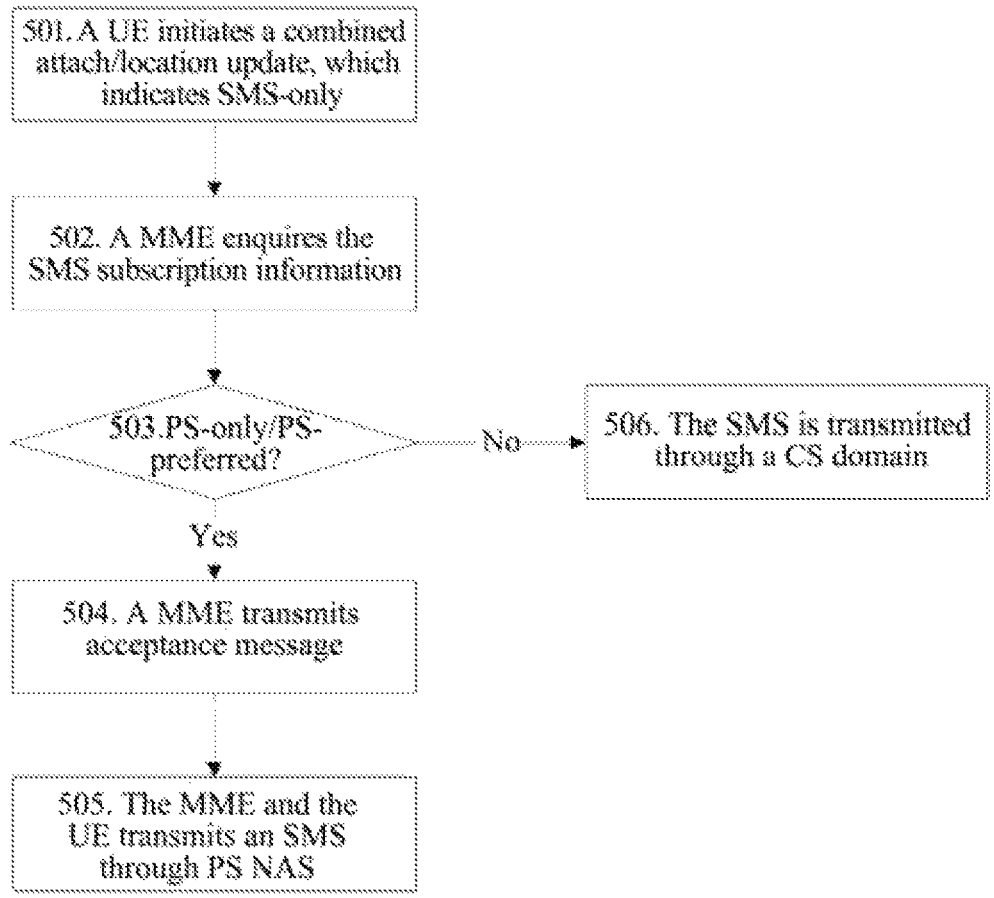
FIG. 5 is a flowchart of a method for implementing PS SMS according to embodiment one of the present document.

The present embodiment implements a method for implementing a PS SMS for a local non-roaming scene, as shown in FIG. 5, comprising the following steps.

In step 501, a UE initiates a combined attach/location update (combined Attach/TAU) request, wherein, the request message comprises an SMS-only indication;

the combined attach refers to EPS/IMSI attach, wherein, the IMSI attach is for the purpose of SMS-only; the location update refers to TAU/LAU;

The combined attach/TAU is transmitted to a corresponding MME.

In addition to the combined attach/location update message, those skilled in the art can easily conceive that other request can also contain the SMS-only indication, for example, a service request or other newly established request message.

In step 502, the MME enquires the subscription information of the UE from the HSS, and when the MME supports the PS SMS, the MME transmits an indication that the PS SMS is supported to the HSS;

Wherein, the indication that the PS SMS is supported can be carried when the subscription information is enquired, or the indication can also be transmitted independently.

The MME refers to a serving MME in the area where the UE is located, and in the present embodiment, the MME supports the PS SMS function;

the MME receives the combined attach/TAU request message of the UE, enquires the subscription information of the UE from the HSS through an S6a interface; the HSS is a local HSS of the UE, i.e., the UE stores the subscription information in the HSS; the subscription information contains PS-only related information;

The MME transmits indication information that the PS SMS is supported to the HSS, at this time, the MME registers with the HSS as a MSC for implementing the SMS, and if the subsequent UE registers with a new MSC, the HSS replaces the MME with a new MSC as an entity for implementing the SMS.

In step 503, the MME determines whether the subscription information is PS-only/PS-preferred, if the subscription information is PS-only/PS-preferred, it is to turn to step 504, if the subscription information is not PS-only/PS-preferred, it is to turn to step 506;

specifically, PS-only subscription information comprises the following two types: PS-only and PS-preferred. Wherein, the PS-only refers to UE only being able to obtain services including an SMS through a PS; the PS-preferred refers to the UE being able to obtain the services including an SMS through a CS domain when the PS domain is unavailable;

specifically, the MME obtains the PS-only subscription information through an S6a interface, if there exists PS-only subscription information, it is illustrated that the UE supports the PS SMS; otherwise, the UE does not support the PS SMS.

In step 504, the MME transmits combined Attach/TAU acceptance message to the UE;

the acceptance message at least includes the following information: a Location Area Identity (LAI); wherein, the LAI is a non-broadcast LAI, and is not associated to any Visitor Location Register (VLR);

the acceptance message further includes: a Temporary Mobile Subscriber Identity (TMSI), which is a reserved TMSI, i.e., the TMSI will not conflict with other TMSIs in use;

the acceptance message further includes: an International Mobile Subscriber Identity (IMSI), attach is for the purpose of SMS-only.

In step 505, the SMS is received and transmitted using PS NAS signaling between the MME and the UE, and the procedure ends.

The SMS is encapsulated in the NAS signaling, and is received and transmitted between the MME and the UE; if the UE is in an RRC Idle mode, the MME first initiates paging, or transmits a PS Mobile Terminated-SMS (MT-SMS, a called SMS) to the UE after waiting for the UE to be connected to the network.

In step 506, the procedure continues according to the existing combined Attach/TAU, and the SMS is transmitted through the CS domain.

Specifically, the UE initiates a location update request, registers with the VLR, completes the registration/update process of the CS domain, and the SMS is transmitted through the CS domain.

In the above embodiment, if the MME does not support the PS SMS and the subscription information of the UE is PS-only, the MME rejects the combined Attach/TAU of the UE; if the MME does not support PS SMS and the subscription information of the UE is PS-preferred, the SMS is transmitted through the CS domain between the MME and the UE.

Embodiment Two

Figure 6:
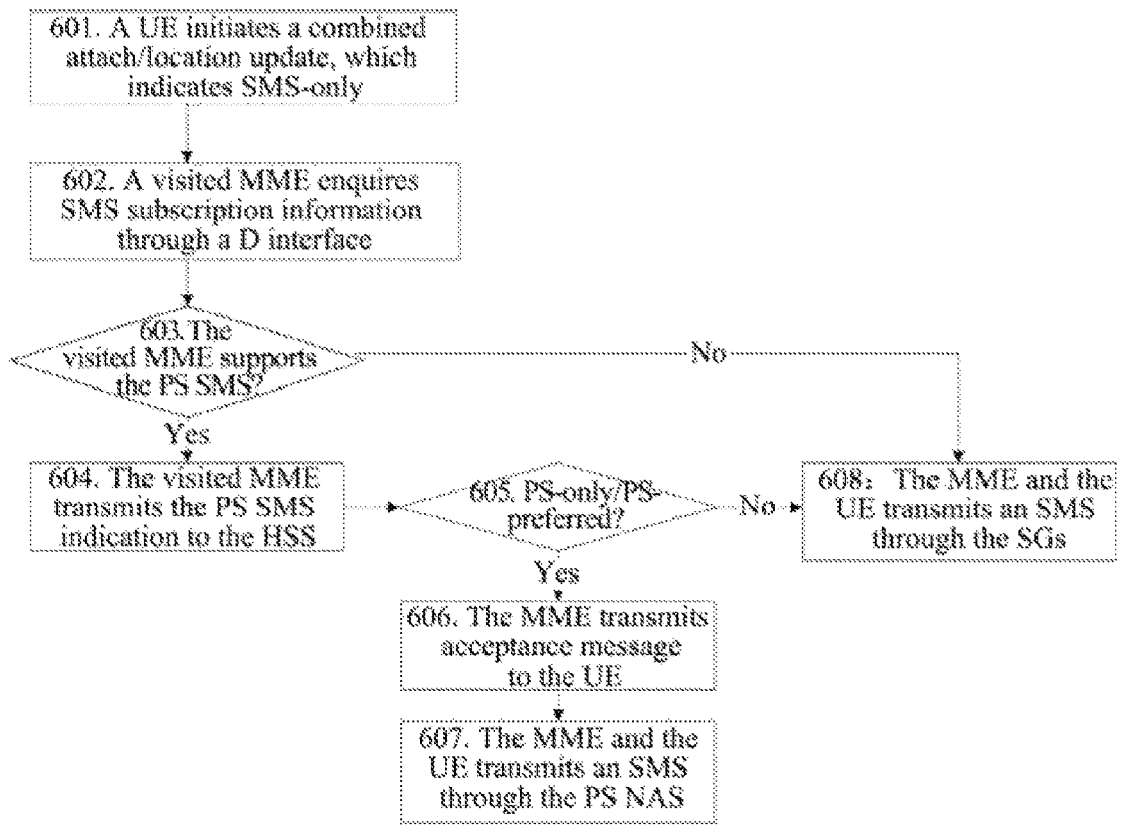
FIG. 6 is a flowchart of a method for implementing PS SMS according to embodiment two of the present document.

The embodiment implements a method for processing a PS SMS for a scene of in-band roaming and the home network not supporting the PS SMS, and as shown in FIG. 6, the method comprises the following steps.

In step 601, a UE initiates a combined attach/location update (combined Attach/TAU) request, wherein, the request message comprises an SMS-only indication;

The present step is the same as step 501, and is not described here again.

In step 602, the visited MME obtains the SMS subscription information on the HSS through a D interface;

As the home network does not support the PS SMS, the S6a interface does not provide SMS subscription information; the visited MME obtains the SMS subscription information on the HSS through the D interface; if the visited MME integrates the MSC function, the visited MME obtains the SMS subscription information through the D interface directly; otherwise, the MSC obtains the SMS subscription information through the D interface, and then transmits the SMS subscription information to the visited MME through an SGs interface.

In step 603, whether the visited MME supports the PS SMS is determined, if the visited MME supports the PS SMS, it is to perform step 604, if the visited MME does not support the PS SMS, it is to perform step 608;

Supporting PS SMS refers to that there is an E interface between the MME and the GMSC/IWMSC, the MME can receive and transmit the SMS through the E interface, and the MME can encapsulate the SMS in the NAS signaling, or parses the SMS out from the NAS signaling.

In step 604, the visited MME transmits an indication that the PS SMS is supported to the HSS;

the visited MME transmits the indication information that the PS SMS is supported to the HSS through the D interface;

If the visited MME integrates the MSC function, the visited MME directly transmits the information to the HSS through the D interface; otherwise, the visited MME transmits the indication information to the MSC through the SGs interface, and then the MSC transmits the information to the HSS through the D interface.

In step 605, whether the subscription information is PS-only/PS-preferred is determined, if the subscription information is PS-only/PS-preferred, it is to turn to step 606, if the subscription information is not PS-only/PS-preferred, it is to turn to step 608;

The present step is the same as step 503, and is not described here again.

In step 606, the visited MME transmits combined Attach/TAU acceptance message to the UE;

The present step is the same as step 504, and is not described here again.

In step 607, an SMS is received and transmitted using PS NAS signaling between the MME and the UE, and the procedure ends;

The present step is the same as step 505, and is not described here again.

In step 608, the visited MME and the UE receive and transmit the SMS through the SGs interface, and the procedure ends.

The SGs interface can be located between the MME and the MSC, or is located in the MME, and if the SGs is located in the MME, the MME integrates the MSC function;

the SGs is located between the MME and the MSC server, and the SGs is used for mobile management and paging procedures between the EPS and the CS, and is based on Gs interface (SGSN-MSC server) procedure. The SGs is also used for transmitting MO/MT SMS.

Receiving and transmitting the SMS through the SGs interface uses the steps in the related art, and will not be described here again.

Embodiment Three

Figure 7:
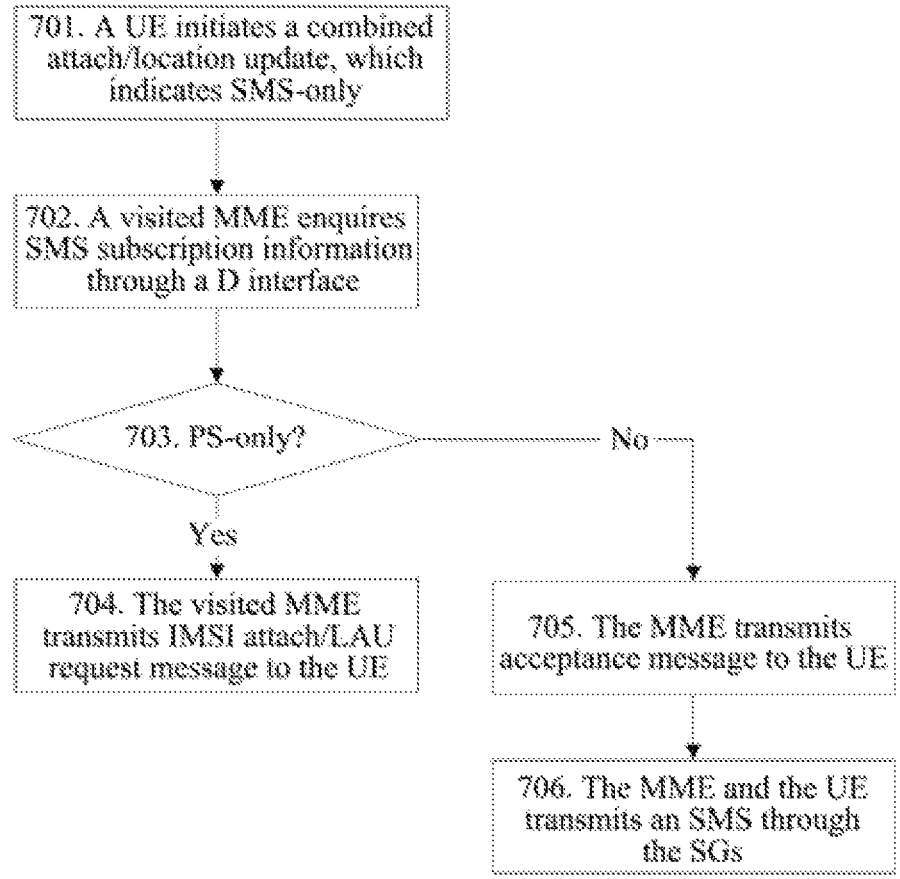
FIG. 7 is a flowchart of a method for implementing PS SMS according to embodiment three of the present document.

The embodiment implements a method for processing effective time in trigger information for a scene of in-band roaming and the visited network not supporting a PS SMS, and as shown in FIG. 7, the method comprises the following steps.

In step 701, a UE initiates a combined attach/location update (combined Attach/TAU) request, wherein, the request message comprises an SMS-only indication;

The present step is the same as step 501, and is not described here again.

In step 702, the visited MME obtains the SMS subscription information on the HSS through a D interface;

the visited MME does not support the PS SMS, and thus can not obtain the SMS subscription information through an enhanced S6a interface, and the visited MME obtains the SMS subscription information through the D interface;

If the visited MME integrates the MSC function, the visited MME directly obtains the SMS subscription information through the D interface; otherwise, the MSC obtains the SMS subscription information through the D interface, and then transmits the information to the visited MME through the SGs interface.

In step 703, whether the subscription information is PS-only is determined, if the subscription information is PS-only, it is to turn to step 704, if the subscription information is not PS-only, it is to turn to step 705;

if the subscription information is PS-only, the PS SMS can not be implemented;

if the subscription information is PS-preferred, the SMS is implemented through the SGs interface.

In step 704, the visited MME transmits IMSI attach/LAU reject message to the UE, and the procedure ends.

The reject message includes: a reject reason; the reject reason is that the visited MME does not support PS SMS and the subscription information requires PS-only.

In step 705, the visited MME transmits combined Attach/TAU acceptance message to the UE;

The acceptance message contains: an IMSI attach for SMS-only indication; and the acceptance message further includes information in the related art, such as LAI, TMSI etc., and the visited MME initiates a location update request to the VLR, which will not be described here again.

In step 706, the visited MME and the UE receive and transmit the SMS through the SGs interface, and the procedure ends.

The present step is the same as step 608, and is not described here again.

Figure 8:
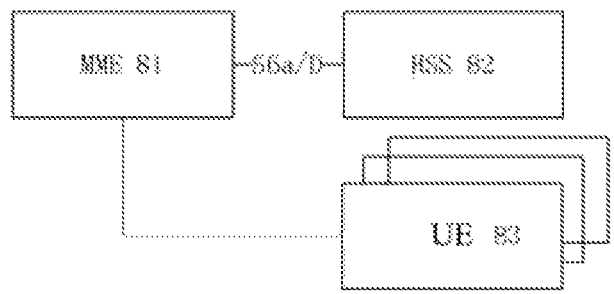
FIG. 8 is a structural diagram of a system for implementing PS SMS according to an embodiment of the present document.

The present document further provides a system for processing a PS SMS, and as shown in FIG. 8, the system comprises: a Mobility Management Entity MME 81, a Home Subscriber Server HSS82, and can further comprise a User Equipment UE83, wherein, the MME41 is configured to receive combined attach/location update request message transmitted by the UE83, request the subscription information from the HSS82 and transmit indication information that the SMS is supported, and receive the subscription information of the UE transmitted by the HSS82; when the MME41 itself supports a PS SMS and the subscription information supports the PS SMS, transmit combined attach/location update acceptance message to the UE83, receive and transmit an SMS through PS NAS signaling from and to the UE83, generate SMS charging information; and the MME41 is further configured to transmit combined attach/TAU acceptance message before receiving and transmitting an SMS through the PS from and to the UE83; the combined attach/location update request acceptance message includes the following information: a Location Area Identity LAI, which is a non-broadcast LAI, and is not associated to a Visited Location Register VLR; a Temporary Mobile Subscriber Identity TMSI, which is a reserved TMSI; and an International Mobile Subscriber Identity IMSI attach is for the purpose of SMS-only.

The HSS82 is configured to store the subscription information of the MME81 and UE83, receive the enquiring request of the MME81 and the indication that the SMS is supported, transmit the subscription information of the UE83 to the MME81; the MME81 registers with the HSS82, the HSS82 registers the MME81 as an SMS service node (such as a MSC) for implementing an SMS, and when the UE83 registers with a new MSC, the HSS82 updates the MME81 with a new MSC for implementing an SMS;

the UE83 is configured to transmit subscription information to the HSS82, transmit combined attach/location update request message to the MME81; receive the combined attach/location update acceptance message transmitted by the MME81; receive and transmit an SMS through a PS.

The MME81 can be a visited MME, or can also be a home MME.

The MME81 is further configured to, when the MME81 itself supports the PS SMS and the subscription information of the UE83 does not support the PS SMS, or the MME81 itself does not support the PS SMS and the subscription information of the UE83 is PS-preferred, receive and transmit the SMS through a CS or an SGs interface from and to the UE83; and/or When the MME81 itself does not support the PS SMS and the subscription information of the UE83 is PS-only, reject the combined attach/location update request from the UE83.

Figure 9:
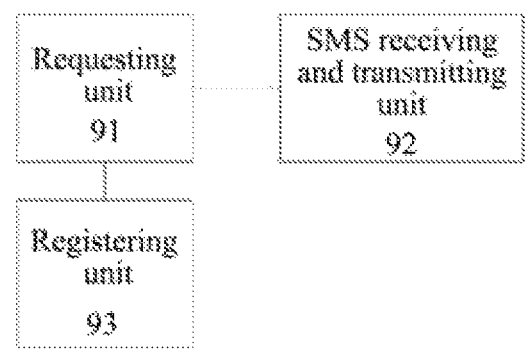
FIG. 9 is a structural diagram of a user equipment for implementing PS SMS according to an embodiment of the present document.

The present document further provides a UE for implementing a PS SMS, as shown in FIG. 9, the UE includes a requesting unit 91, an SMS receiving and transmitting unit 92 and a registering unit 93, wherein, the requesting unit 91 is configured to transmit combined Attach/location update request message to the MME81;

the short message receiving and transmitting unit 92 is configured to receive and transmit an SMS through a PS from and to the mobility management entity after receiving the Attach/location update acceptance message transmitted by the MME81. Specifically, the SMS is received and transmitted through non access stratum signaling.

The registering unit 93 is configured to register subscription information about whether the UE supports the PS SMS with a HSS.

The above description is only preferable embodiments of the present document, and is not used to limit the protection scope of the present document.

A person having ordinary skill in the art can understand that all or a part of steps in the above method can be implemented by programs instructing related hardware, the programs can be stored in a computer readable storage medium, such as a read-only memory, a disk or a disc etc. Alternatively, all or a part of steps in the above embodiments can also be implemented by one or more integrated circuits. Accordingly, each module/unit in the above embodiments can be implemented in the form of hardware, or can also be implemented in the form of software functional module. The present document is not limited to any particular form of a combination of hardware and software.

INDUSTRIAL APPLICABILITY

The embodiments of the present document provide a method for implementing a PS SMS in the EPS, comprising: a UE transmitting an SMS-only indication to an MME, the MME transmitting a response to the UE according to the subscription data and the capability of its own, and if the MME and the UE support PS SMS, receiving and transmitting through the PS domain; otherwise, receiving and transmitting through a CS or SGs interface. The embodiments of the present document further provide a system for implementing a PS domain SMS in the EPS and a user equipment. By the scheme of the embodiments of the present document, the problems of implementing the PS domain SMS in the EPS system can be solved.

What is claimed is:

1. A method for implementing a Packet Switched domain (PS) Short Message Service (SMS), comprising:

after receiving a request message containing an SMS-only indication transmitted by a user equipment, a mobility management entity (MME) enquiring about a subscription information of the user equipment from a home subscriber server, and receiving the subscription information of the user equipment returned by the home subscriber server; and when the MME supports the PS SMS and the subscription information supports the PS SMS, the MME transmitting a request acceptance message to the user equipment, the MME receiving and transmitting an SMS from and to the user equipment through a Packet Switched domain; wherein, the request acceptance message comprises the following information: a Location Area Identity (LAI), which is a non-broadcast LAI and is not associated with a Visitor Location Register (VLR); a Temporary Mobile Subscriber Identity (TMSI), which is a reserved TMSI; and an International Mobile Subscriber Identity (IMSI) attach which is for a purpose of SMS-only;

when the MME supports the PS SMS, the MME further transmitting an indication that the PS SMS is supported to the home subscriber server;

after receiving the indication that the PS SMS is supported, the home subscriber server registering the MME as an SMS serving node of the user equipment.

2. The method according to claim 1, wherein, the step of the MME receiving and transmitting an SMS from and to the user equipment through a PS comprises:

the MME receiving and transmitting the SMS through PS non access stratum signaling from and to the user equipment.

3. The method according to claim 1, wherein, the method further comprises:

when the MME supports the PS SMS and the subscription information of the user equipment does not support the PS SMS, or the MME does not support the PS SMS and the subscription information of the user equipment is PS-preferred, the MME receiving and transmitting the SMS through a circuit switched domain or an SGs interface from and to the user equipment; and/or when the MME does not support the PS SMS and the subscription information of the user equipment is PS-only, the MME rejecting the request containing the SMS-only indication from the user equipment.

4. The method according to claim 1, wherein, the MME is a home MME of the user equipment, or is a visited MME of the user equipment.

5. The method according to claim 1, wherein, the request message containing an SMS-only indication is combined Attach/location update request message.

6. A system for implementing a Packet Switched domain (PS) Short Message Service (SMS), comprising a mobility management entity (MME) and a home subscriber server, wherein, the MME is configured to, after receiving a request message containing an SMS-only indication transmitted by a user equipment, enquire about a subscription information of the user equipment from the home subscriber server, receive the subscription information of the user equipment returned by the home subscriber server, when the MME supports a PS SMS and the subscription information supports the PS SMS, transmit a request acceptance message to the user equipment, and receive and transmit an SMS from and to the user equipment through a PS; wherein, the request acceptance message comprises the following information: a Location Area Identity (LAI), which is a non-broadcast LAI and is not associated with a Visitor Location Register (VLR); a Temporary Mobile Subscriber Identity (TMSI), which is a reserved TMSI; and an International Mobile Subscriber Identity (IMSI) attach which is for a purpose of SMS-only;

the home subscriber server is configured to store the subscription information of the user equipment; and return the subscription information of the user equipment to the MME after receiving the request for enquiring the subscription information of the user equipment from the mobility management entity;

the MME is further configured to, when the MME supports the PS SMS, transmit an indication that the PS SMS is supported to the home subscriber server;

the home subscription server is further configured to, after receiving the indication that the PS SMS is supported, register the MME as an SMS serving node of the user equipment.

7. The system according to claim 6, wherein, the MME is configured to receive and transmit the SMS through PS non access stratum signaling from and to the user equipment.

8. The system according to claim 6, wherein, the MME is further configured to:

when the MME supports the PS SMS and the subscription information of the user equipment does not support the PS SMS, or the MME does not support the PS SMS and the subscription information of the user equipment is PS-preferred, receive and transmit the SMS through a circuit switched domain or an SGs interface from and to the user equipment; and/or when the MME does not support the PS SMS and the subscription information of the user equipment is PS-only, reject the request containing the SMS-only indication from the user equipment.

9. The system according to claim 6, wherein, the MME is a home MME of the user equipment, or is a visited MME of the user equipment.

10. The system according to claim 6, wherein, the request message containing an SMS-only indication is combined Attach/location update request message.

11. A user equipment for implementing a Packet Switched domain (PS) Short Message Service (SMS), comprising:

a registering unit, configured to register subscription information about whether the user equipment supports the PS SMS with a home subscriber server;

a requesting unit, configured to transmit a request message containing an SMS-only indication to the mobility management entity (MME); and a short message receiving and transmitting unit, configured to receive and transmit an SMS through a PS from and to the MME after receiving the request acceptance message transmitted by the mobility management entity; wherein, the request acceptance message comprises the following information: a Location Area Identity (LAI), which is a non-broadcast LAI and is not associated with a Visitor Location Register (VLR); a Temporary Mobile Subscriber Identity (TMSI), which is a reserved TMSI; and an International Mobile Subscriber Identity (IMSI) attach which is for a purpose of SMS-only;

wherein when the MME supports the PS SMS, the MME further transmits an indication that the PS SMS is supported to the home subscriber server; and after receiving the indication that the PS SMS is supported, the home subscriber server registers the MME as an SMS serving node of the user equipment.

12. The user equipment according to claim 11, wherein, the user equipment is configured to receive and transmit the SMS through PS non access stratum signaling from and to the mobility management entity.

* * * * *